United States Patent
Sasae

(10) Patent No.: US 8,052,344 B2
(45) Date of Patent: Nov. 8, 2011

(54) RESIN COMPONENT AND IMAGE FORMING APPARATUS

(75) Inventor: Kazuyoshi Sasae, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 576 days.

(21) Appl. No.: 11/564,731

(22) Filed: Nov. 29, 2006

(65) Prior Publication Data

US 2007/0140813 A1    Jun. 21, 2007

(30) Foreign Application Priority Data

Dec. 21, 2005  (JP) ................. 2005-368251

(51) Int. Cl.
  *E01F 9/018*   (2006.01)
  *F16D 9/00*    (2006.01)
  *F16P 5/00*    (2006.01)
(52) U.S. Cl. .................... 403/2; 403/408.1
(58) Field of Classification Search ........... 403/2, 408.1; 439/301, 475; 399/380; 400/693
  See application file for complete search history.

(56) References Cited

U.S. PATENT DOCUMENTS

| | | | | | |
|---|---|---|---|---|---|
| 3,856,424 | A | * | 12/1974 | Beck et al. | 403/227 |
| 4,784,510 | A | * | 11/1988 | Messori | 403/25 |
| 5,119,955 | A | * | 6/1992 | Granofsky | 220/270 |
| 5,664,705 | A | * | 9/1997 | Stolper | 222/212 |
| 6,698,820 | B2 | * | 3/2004 | Nakata | 296/193.09 |
| 7,331,731 | B2 | * | 2/2008 | Hohlbein et al. | 401/133 |
| 7,393,590 | B2 | * | 7/2008 | Scheer et al. | 428/480 |
| 7,452,316 | B2 | * | 11/2008 | Cals et al. | 493/95 |
| 2004/0258451 | A1 | * | 12/2004 | Kato | 400/691 |

FOREIGN PATENT DOCUMENTS

| | | | |
|---|---|---|---|
| JP | 58156955 A | * | 9/1983 |
| JP | 08-340661 A | | 12/1996 |
| JP | 10-186961 A | | 7/1998 |
| JP | 11-078062 A | | 3/1999 |
| JP | 2001-219618 A | | 8/2001 |
| JP | 2001-219618 A | | 8/2001 |
| JP | 02005051880 A | * | 2/2005 |

* cited by examiner

*Primary Examiner* — Daniel P. Stodola
*Assistant Examiner* — Nahid Amiri
(74) *Attorney, Agent, or Firm* — Canon U.S.A., Inc., IP Division

(57) ABSTRACT

A biodegradable plastic of a screw-fastened portion which remains on a metal component can be decomposed and dissolved by immersing in a degradative enzyme while being joined with the metal component. Further, since the amount of the biodegradable plastic is small and a shape such as a groove is provided which can increase a contact area with the degradative enzyme, decomposition can be completed in a short time.

3 Claims, 13 Drawing Sheets

RESIN COMPONENT AND IMAGE FORMING APPARATUS

BACKGROUND OF THE INVENTION

1. Field of the Invention

The present invention relates to a resin component using a biodegradable plastic, a resin component of an electrophotographic image forming apparatus (hereinafter referred to as an image forming apparatus) such as a copying machine, a printer, a recording image display apparatus, and a facsimile, which are configured to form a visible image by an electrophotographic process, an electrostatic recording process, or the like, and its decomposition.

2. Description of the Related Art

In recent years, colorization has advanced in electrophotographic multifunction peripherals and printers. Further, the performance thereof has also been evolved year by year. The product cycle thereof has increasingly become short. Accordingly, the number of used and collected instruments has also increased. In used multifunction peripherals and printers, components are often broken back down into materials, which are molded again to be utilized for recycling. Alternatively, components are cleaned to be recycled.

However, it is difficult to reuse all of the components. Thus, in some cases, many components are still unrecycled. For such unrecycled components, the use of biodegradable plastic has received attention as a material facilitating exceedingly reducing environmental pollution since biodegradable plastic can be used in a way similar to a conventional plastic product.

The main benefit of biodegradable plastic is that it "returns to nature." For instance, biodegradable plastic after use can be decomposed into water and carbon dioxide by a degradative enzyme. Accordingly, when waste products are disposed of, biodegradable plastic can be buried in the ground. And even if biodegradable plastic is burned, the amount of generated heat can be reduced. Hence, the biodegradable plastic material can be used in a plastic portion of a device that is difficult to reuse and is disposed of. Therefore, even if plastic is disposed of, environmental pollution can be prevented.

Biodegradable plastic is a polymer of natural origin, which is synthesized from a raw material of a plant-derived resource such as corn. As mentioned above, biodegradable plastic can be decomposed into carbon dioxide and water by bacteria in the ground, a degradative enzyme, or the like. Japanese Patent Application Laid-Open Nos. 11-78062, 2001-219618, and 10-186961 discuss a configuration in which biodegradable plastic is used as a part of an image forming apparatus so as to prevent environmental pollution.

As biodegradable plastic is increasingly applied to image forming apparatuses, there are many circumstances that call for a biodegradable plastic component to be fastened to another metal component with a fastening member such as a screw. However, if a biodegradable plastic component is joined to a metal component, when these components are separated from each other, screw-removing work significantly requires time. Thus, a disassembling cost becomes exceedingly high. That is, when a component is located between screws, depending on an area to which a screw is attached, it is difficult to separate components. Further, since a large torque is provided on a screw, a large burden may be imposed on a worker during the disassembly and material separation/sorting process.

On the other hand, there is a method of immersing a unit joined with a metal component and a biodegradable plastic component in a degradative enzyme liquid to decompose the components. However, even if this method is employed, it is difficult for a degradative enzyme liquid to reach a junction surface between the biodegradable plastic component and the metal component. Thus, it takes a certain amount of time to decompose the biodegradable plastic completely. As a result, until the biodegradable plastic component is decomposed, the metal component cannot proceed to the next process such as recycling. Accordingly, it becomes necessary to separate the metal component from the biodegradable plastic component in a short time and easily during disassembling.

Therefore, it would be desirable to provide a system and/or method present directed to facilitating separating a biodegradable plastic material from another component in a short time even if the biodegradable plastic component and another component are immersed in a degradative enzyme liquid in a state in which the biodegradable plastic component and another component are joined together.

SUMMARY OF THE INVENTION

The present invention is directed to facilitating separating a biodegradable plastic material from another component in a short time even if the biodegradable plastic component and another component are immersed in a degradative enzyme liquid in a state in which the biodegradable plastic component and another component are joined together.

According to an aspect of the present invention, a fastening assembly for a device comprising is provided which includes a first component made of a biodegradable plastic material; a second component made of a non-biodegradable material securely joined to the first component; and a guide portion, provided on at least one of the first component or the second component, disposed proximate an interface between the first and second component to guide a degradation liquid for degrading the biodegradable plastic.

According to another aspect of the present invention, the guide portion includes a groove formed on the first component proximate the interface, wherein the groove connects to an exposed outside region of the interface. And according to another aspect of the present invention, the guide portion has a plurality of holes passing through toward the interface between the first and second component. According to still yet another aspect of the present invention, the guide portion is provided on the first component.

Moreover, according to another aspect of the present invention, the first component has a groove that is formed continuously and linearly to surround the interface. And with regard to yet another aspect of the present invention, the first component may have a notch provided on at least one of a starting point and an end point of the groove. Further, according to yet another aspect of the present invention, the first component may be an exterior cover of an image forming apparatus. And, according to still yet another aspect of the present invention, the first component may be an airflow duct adapted to deliver air from an inside to an outside of an image forming apparatus.

According to another aspect of the present invention, a fastening assembly is provided including a plastic first component having an upperside and an underside and at least one mounting region at least partially circumscribed by a first groove disposed in the upperside or underside of the first component; a second component made from a rigid material; and a fastener adapted to securely hold the first and second components together, wherein when the first component is pulled away from the second component during a disassembly recycling process, the first component is adapted to tear along the first groove such that the at least one mounting region remains attached to the second component via the fastener while a remaining portion of the first component entirely separates from the fastening interface.

According to yet another aspect of the present invention, the first component is biodegradable. And according to yet another aspect of the present invention, the underside of the mounting region includes a plurality of second grooves formed therein. Additionally, according to another aspect of the present invention, the at least one mounting region further may include a standoff portion which elevates the first component above the second component.

Moreover, according to yet another aspect of the present invention, a method is provided for disassembling and recycling components from devices having at least one fastening interface optimized for expedient disassembly. The at least one fastening interface includes a biodegradable plastic first component having an upperside and an underside and at least one mounting region at least partially circumscribed by a first groove disposed in the upperside or underside of the first component; a second component made from a rigid non-biodegradable material; and a fastener adapted to securely hold the first and second components together, wherein the first component is adapted to tear along the first groove such that the at least one mounting region remains attached to the second component via the fastener while a remaining portion of the first component entirely separates from the fastening interface. Here, the method includes pulling away the first component from the second component such that the first component separates entirely from the second component; and immersing the second component into a degradative enzyme liquid component.

And, according to yet another aspect of the present invention, the method may further include treating the first component separately from the second component. Furthermore, according to another aspect of the present invention, the underside of the mounting region includes a plurality of second grooves formed therein. Still yet, according to another aspect of the present invention, the at least one mounting region further includes a standoff portion which elevates the first component above the second component.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will now herein be described in detail below with reference to the drawings.

First Exemplary Embodiment

A first exemplary embodiment of the present invention will be described below with reference to the drawings.

Figure 1:
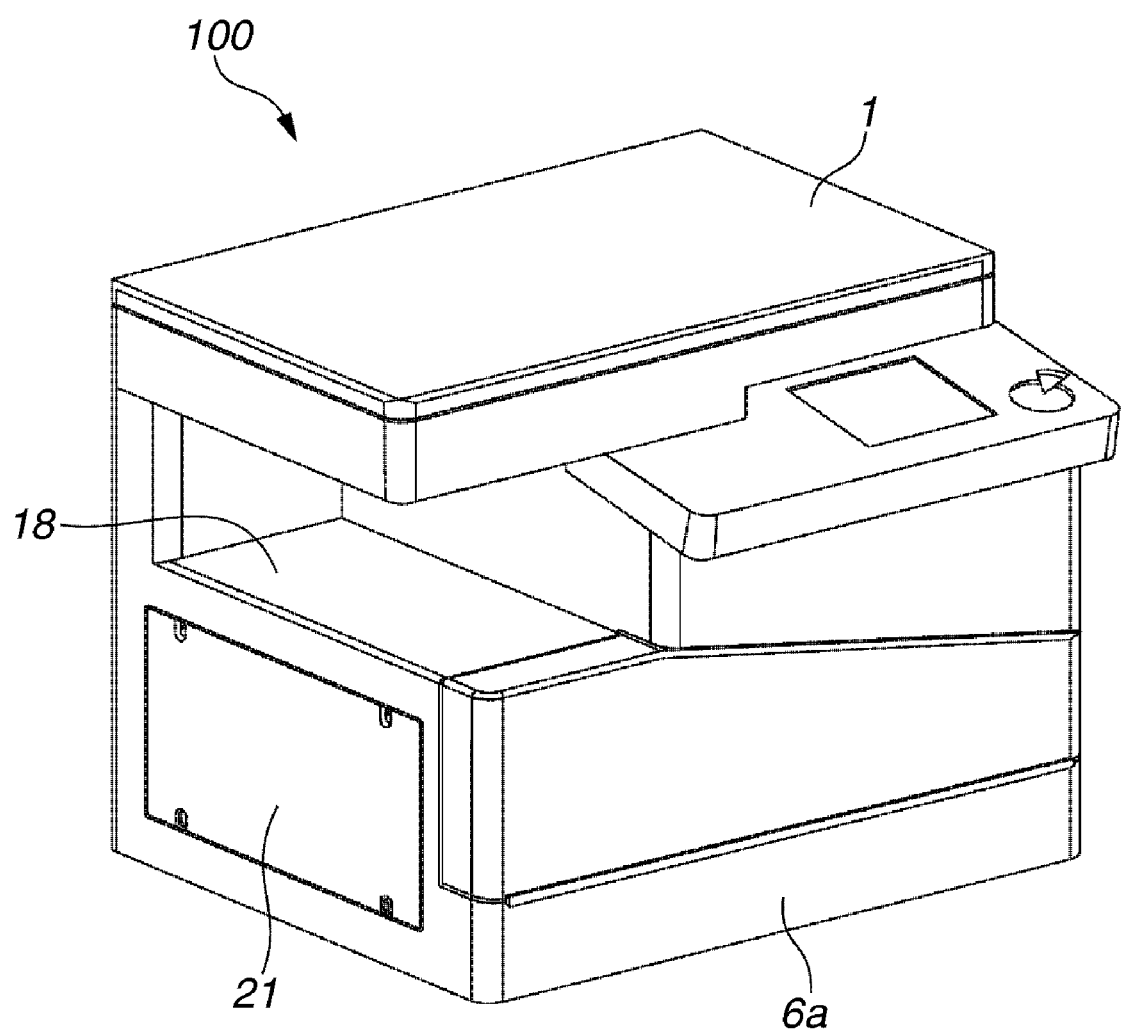
FIG. 1 is an external view showing an example image forming apparatus according to an exemplary embodiment of the present invention.
Figure 2:
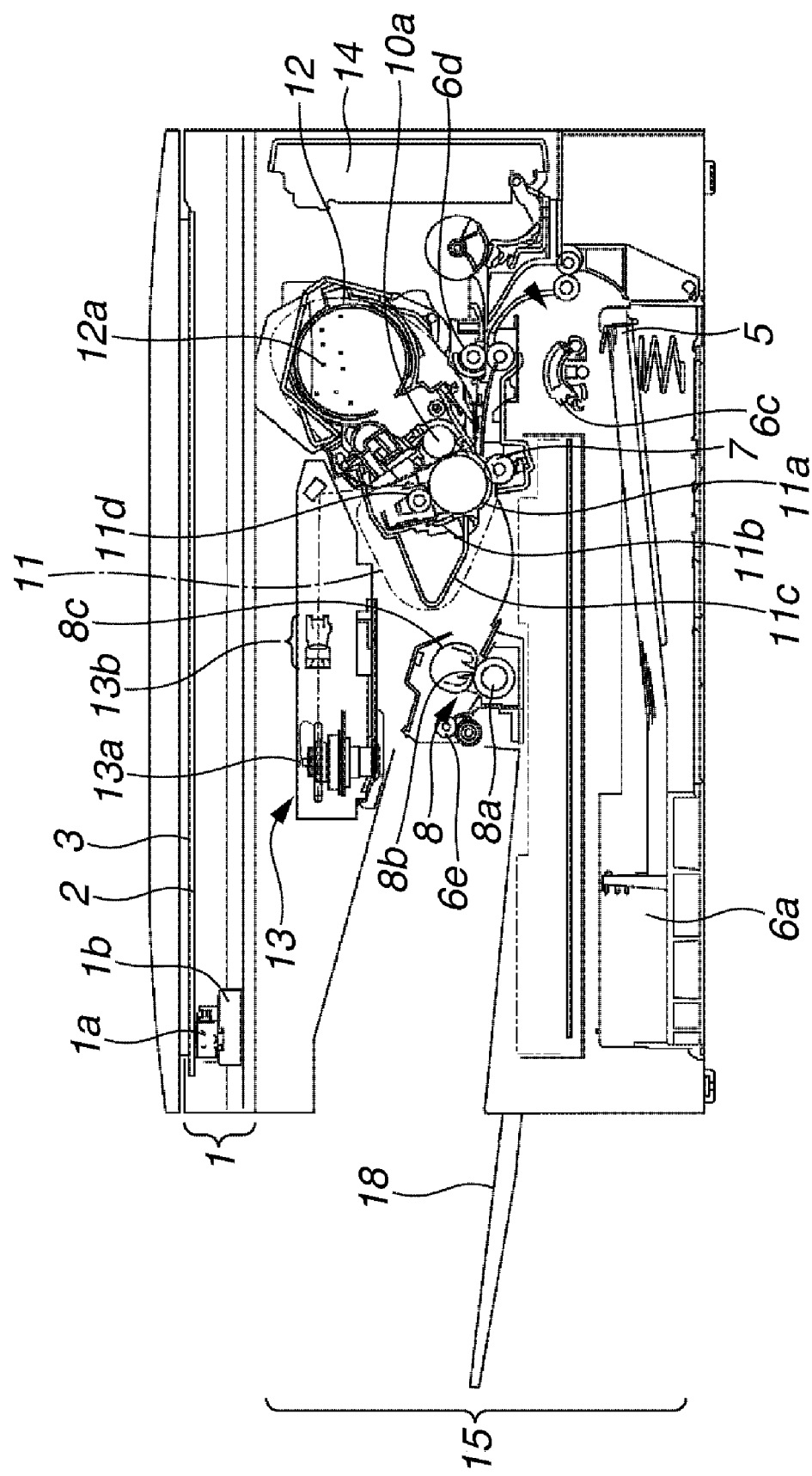
FIG. 2 is a cross sectional view showing an example image forming apparatus according to an exemplary embodiment of the present invention.

FIGS. 1 and 2 are an external view and a cross sectional view, respectively, showing a multifunction peripheral serving as an image forming apparatus according to the first exemplary embodiment of the present invention. An image forming apparatus 100 includes a document reading device 1 for reading an image of a document 3 and a printer 15 for forming an image on a recording material 5. Image data read with the above-described operation is stored in a memory (not shown) and output to the printer 15.

The document 3 is placed on a platen (document placing board) 2 with an image surface thereof facing downward. The document 3 is illuminated by an illuminating lamp (not shown) provided near a reading sensor 1a of contact image sensor (CIS) type which is lengthwise in a main scanning direction. Reflected light from the document 3 is read by the reading sensor 1a. During a reading action, a scanner sensor unit that includes the illuminating lamp, the reading sensor 1a, and a sensor moving device 1b moves relative to the document 3, which is placed on the platen 2. In the present exemplary embodiment, a CIS type sensor can be replaced with another type of image sensor.

The recording material 5 is contained in a cassette 6a or a multiple feeding tray 14 inside the printer 15. A feeding roller 6c is rotated according to an image forming signal. Thus, a sheet of the recording material 5 is successively fed from the cassette 6a. The fed recording material 5 is then supplied to an image forming section 11 with timing adjusted with a registration roller 6d.

A signal output from the reading sensor 1a is transmitted to a laser scanner unit 13. The laser scanner unit 13 emits a laser beam corresponding to the transmitted signal to a polygon mirror 13a, which is a rotary polyhedral mirror. The laser beam reflected by the polygon mirror 13a impinges on a photosensitive drum 11a, which is an image bearing member, through an image forming lens 13b. In the image forming section 11, the photosensitive drum 11a is rotated by a motor (not shown). After the photosensitive drum 11a is charged with desired potentials by a charge roller 11d, which is a charging member, the photosensitive drum 11a receives an image exposure by the laser beam to form an electrostatic latent image thereon. Then, with toner 12a supplied by a developing sleeve 10a from a developing unit 12, the electrostatic latent image is developed as a toner image. The conveyed recording material 5 is forwarded to beneath the photosensitive drum 11a. The formed toner image is transferred onto the recording material 5 by a transfer roller 7, which is a transferring member. Toner remaining on the photosensitive drum 11a is scraped off by a cleaning blade 11b, which is a cleaning member. Then, toner is recovered to a waste toner container 11c.

After the recording material 5 is separated from the photosensitive drum 11a, the recording material 5 is forwarded to a fixing device 8. The recording material 5 passes between a fixing film 8c, which is a fixing member heated by a heater 8b, and a pressure roller 8a, which is a pressing member. Thus, the toner image is fixed onto the recording material 5 by heat and pressure. Thereafter, the recording material 5 is discharged to a discharge tray 18 by a discharge roller 6e. According to the above-described process, an image is formed on the recording material 5.

When biodegradable plastic is used in the above-described image forming apparatus 100, it is useful to apply biodegradable plastic to a portion that has a low requirement on heat resistance and endurance strength in consideration of the property of biodegradable plastic. Biodegradable plastic can be easily deformed at high temperatures and is weak in strength. For example, it is useful to apply biodegradable plastic to a portion, such as an exterior cover or an airflow duct, which is not largely applied with a dynamic load even if the image forming apparatus operates.

A body cover 21 shown in FIG. 1 is configured with biodegradable plastic. This is because the body cover 21 uses a large amount of material and serves an exterior cover, which does not require large strength and heat resistance.

Biodegradable plastic can be decomposed by the action of bacteria or degradative enzymes. Biodegradable plastic can be mostly decomposed into water and carbon dioxide by hydrolysis. Biodegradable plastic can be chemically synthesized. Biodegradable plastic has a biodegradable function among materials which are chemically synthesized. Specifically, biodegradable plastic may include, for example, polycaprolactone, polybutylene succinate, polyethylene succinate, polyglycolic acid, aliphatic polyester such as polylactic acid, polyvinyl alcohol, other polyurethane, and nylon oligomer. In the present exemplary embodiment, the body cover 21 is made of a biodegradable plastic material of polylactic acid.

Further, in addition to the chemically synthesized material, a biodegradable plastic which is a resin utilizing a polymer formed by bacteria may be used. For example, this biodegradable plastic includes linear polyester of 3-hydroxy butyrate (HB) and 3-hydroxy valerate (HV).

Furthermore, a natural polymer which is a resin extracted from a substance existing in nature may be used. For example, the natural polymer includes a benzylation wood (cellulose and lignin of wood are subjected to alkali treatment by caustic soda to react with a chemical material having a benzyl group and an acetyl group to form plastic). The natural polymer further includes a higher fatty acid esterification wood, material that loads gluten of wheat with glycerin, glycol, emulsifying silicone oil and urea, material that loads cellulose with chitosan, pullulan, alginic acid, chitin, chitosan, carrageenan, and starch.

Still furthermore, a lipase or a lipase active material can be used as a degradative enzyme. Biodegradable plastic is decomposed by an enzyme produced by involving bacteria. In the above-described lipase, in addition to the lipase for the degradative enzyme, an esterase which carries out ester hydrolysis, a phospholipase, a lysophospholipase or the like may be employed. Further, the lipase active material carries out a similar action to that of the lipase. Specifically, the lipase active material includes a crude lipase, a lipase-containing material, lipase production bacteria, and a lipase production culture material. Note that the degradation liquid is liquid containing such a degradative enzyme.

Since the biodegradable plastic is, e.g., polylactic acid, the present exemplary embodiment uses a liquid containing a lipase as a degradation liquid.

Figure 3:
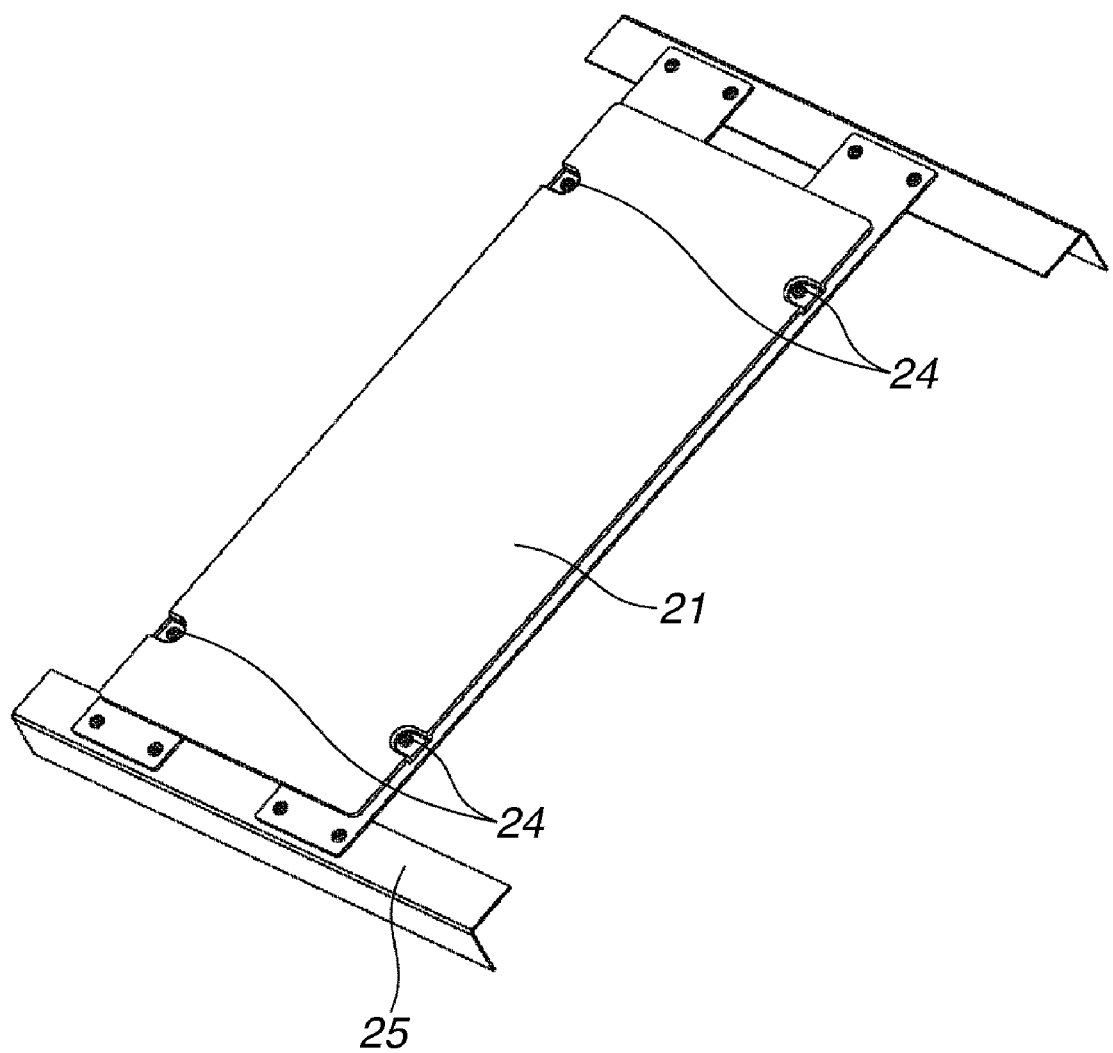
FIG. 3 is a diagram showing an example configuration in which a metal frame and a cover are joined together according to an exemplary embodiment of the present invention.

A resin component shown in FIG. 3 includes an exterior cover 21 made of biodegradable plastic and a metal frame 25 made of a non-biodegradable material, which is located inside the printer 15. The exterior cover 21 and the metal frame 25 are integrally joined together by screws 24 at a plurality of locations so as to be fixed without a rattle and a clearance.

Figure 6:
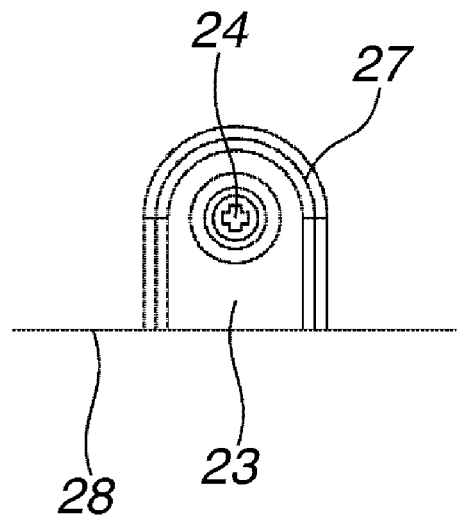
FIG. 6 is a detail diagram showing an example screw-fastened portion of a cover according to an exemplary embodiment of the present invention.
Figure 8:
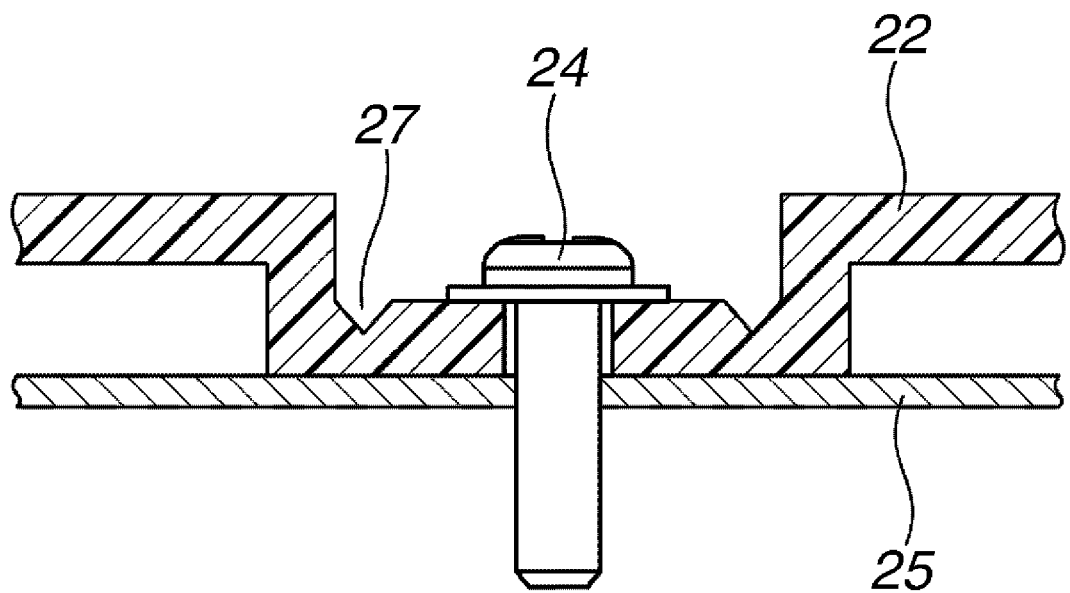
FIG. 8 is a cross sectional view showing the screw-fastened portion of a cover according to an exemplary embodiment of the present invention.

Further, as shown in FIGS. 6 and 8, a screw-fastened portion 23 of the exterior cover 21 is provided with a continuous linear groove 27 which connects to an end face 28 of the screw-fastened portion 23 to surround the screw-fastened portion 23. The groove 27 facilitates easily separating the exterior cover 21 from the metal frame 25 while leaving the screw-fastened portion 23.

The depth of the groove 27 can be set to such an extent that the screw-fastened portion 23 cannot be separated off even if a user unexpectedly causes stress on the exterior cover 21. During disassembling, a large stress can be imparted on a component with a tool or the like. Thus, since the stress is concentrated on the groove 27, the screw-fastened portion 23 can be easily separated off.

Figure 4:
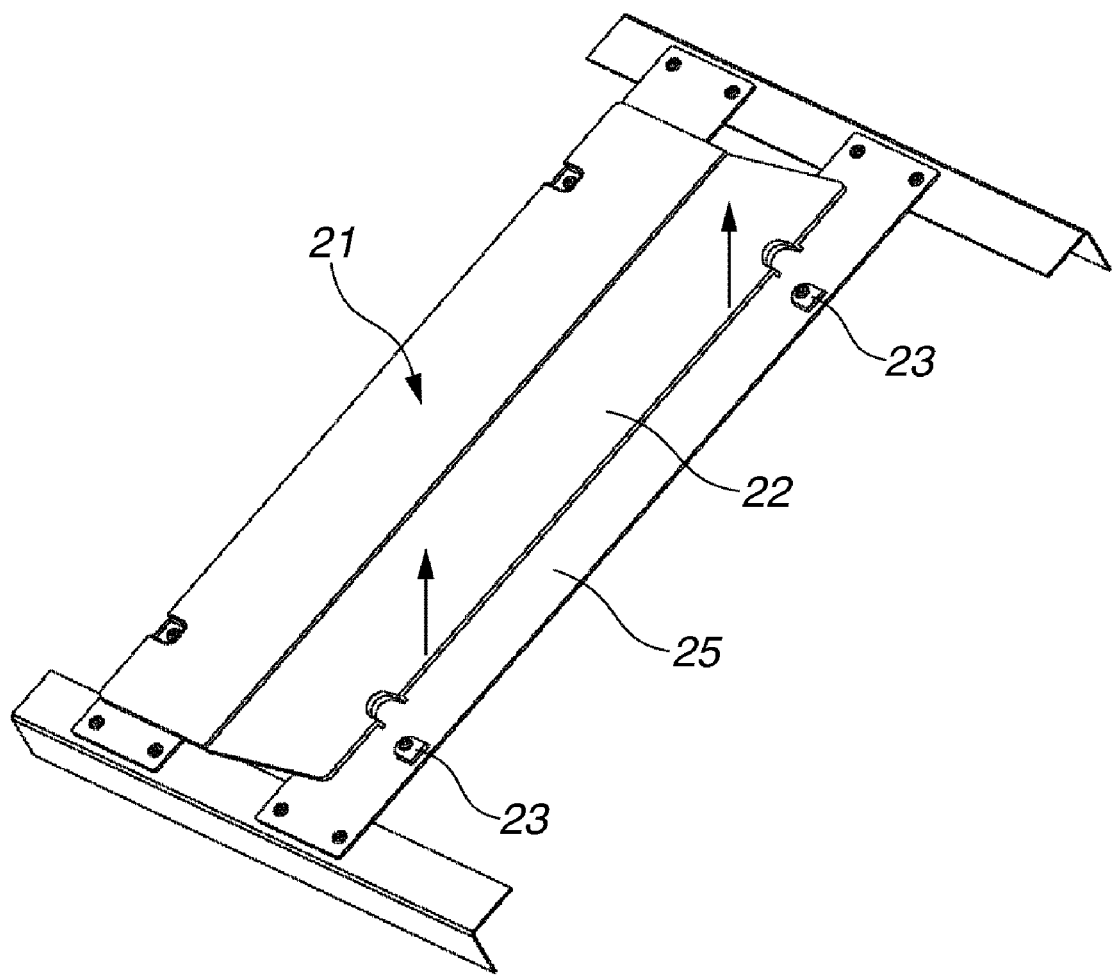
FIG. 4 is a perspective view showing an example state in which a cover is being separated from a metal frame according to an exemplary embodiment of the present invention.
Figure 5:
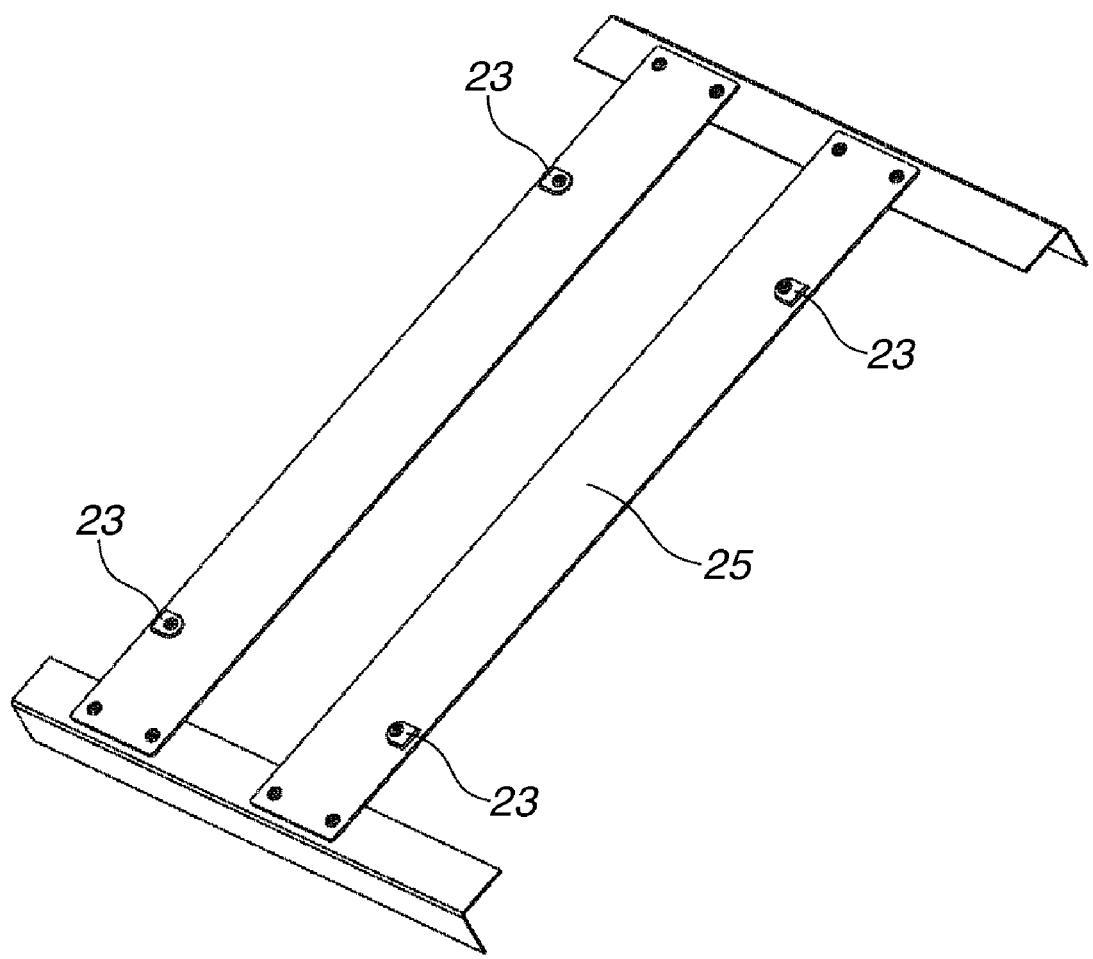
FIG. 5 is a perspective view showing an example state after a cover has been separated from a metal frame according to an exemplary embodiment of the present invention.

As shown in FIG. 4, stress can be applied to move the exterior cover 21 in the direction of an arrow with a common (inexpensive) disassembling tool such as a pinch bar. Accordingly, a major portion 22 of the exterior cover 21 can be separated from the metal frame 25 while leaving the screw-fastened portion 23, which is a junction portion. With this operation repeated, as shown in FIG. 5, only the metal frame 25 and the screw-fastened portion 23, which is a part of the biodegradable plastic exterior cove 21, remain.

Figure 7:
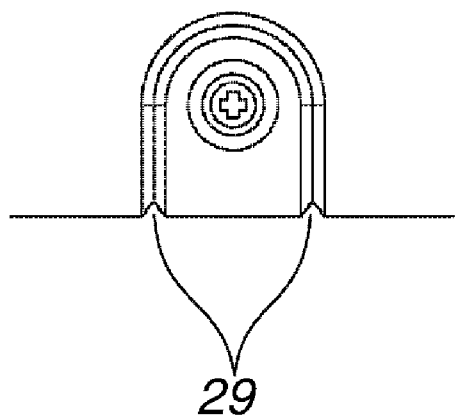
FIG. 7 is a detail diagram showing an example screw-fastened portion provided with a notch according to an exemplary embodiment of the present invention.

In the present exemplary embodiment, as shown in FIG. 7, the end face of the groove 27 around the screw-fastened portion 23 may be provided with a notch 29. Accordingly, the screw-fastened portion 23 can be separated off with a smaller stress.

Figure 9:
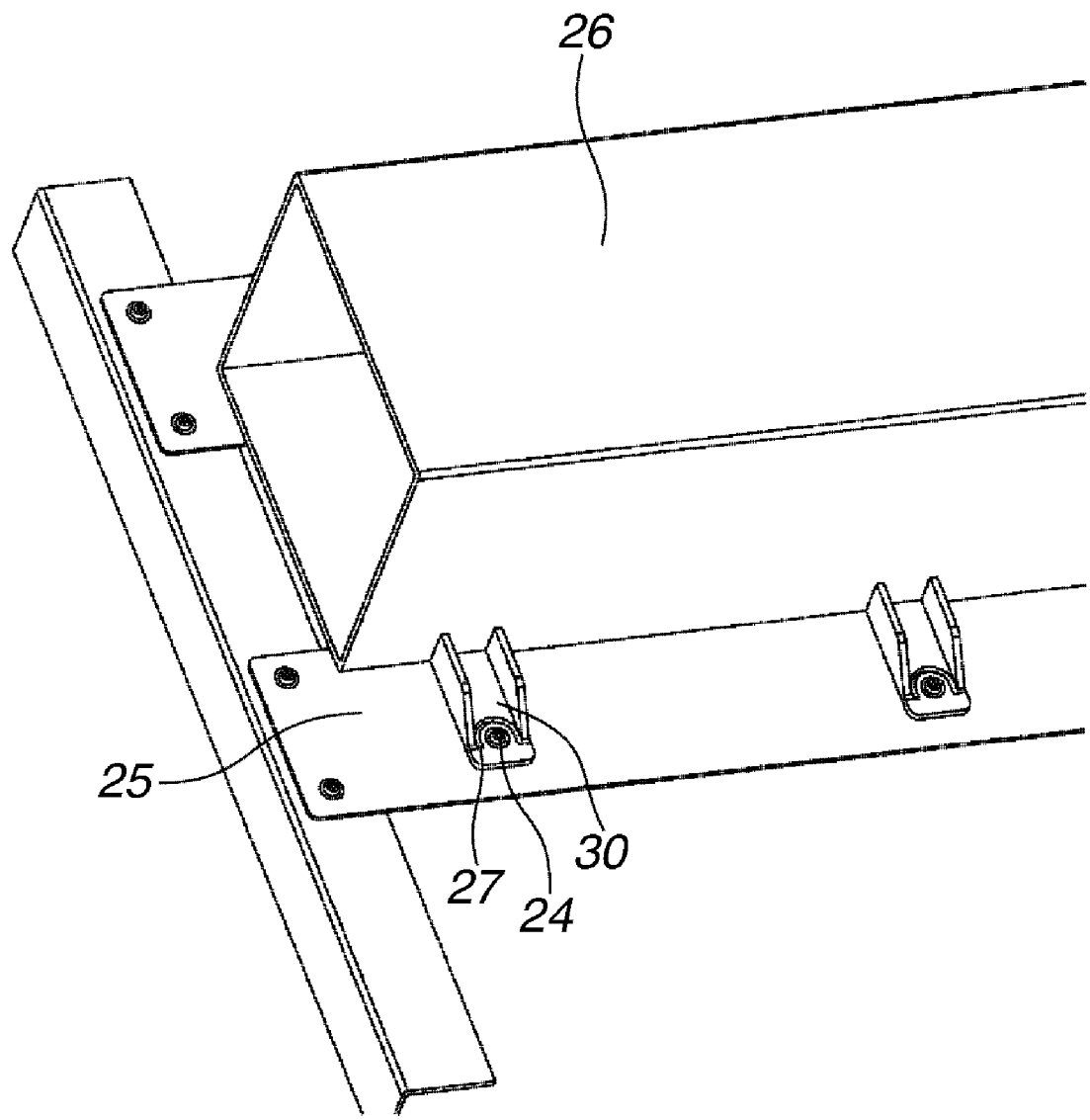
FIG. 9 is a perspective view showing another configuration in which a metal frame and a duct are joined together according to an exemplary embodiment of the present invention.

Also, in addition to the shape of the screw-fastened portion 23 of the exterior cover 21 as shown in FIG. 6, a screw-fastened portion can be configured as follows. As illustrated in FIG. 9, an attaching portion 30 extends from a duct 26 having a large cross-sectional area.

Figure 10:
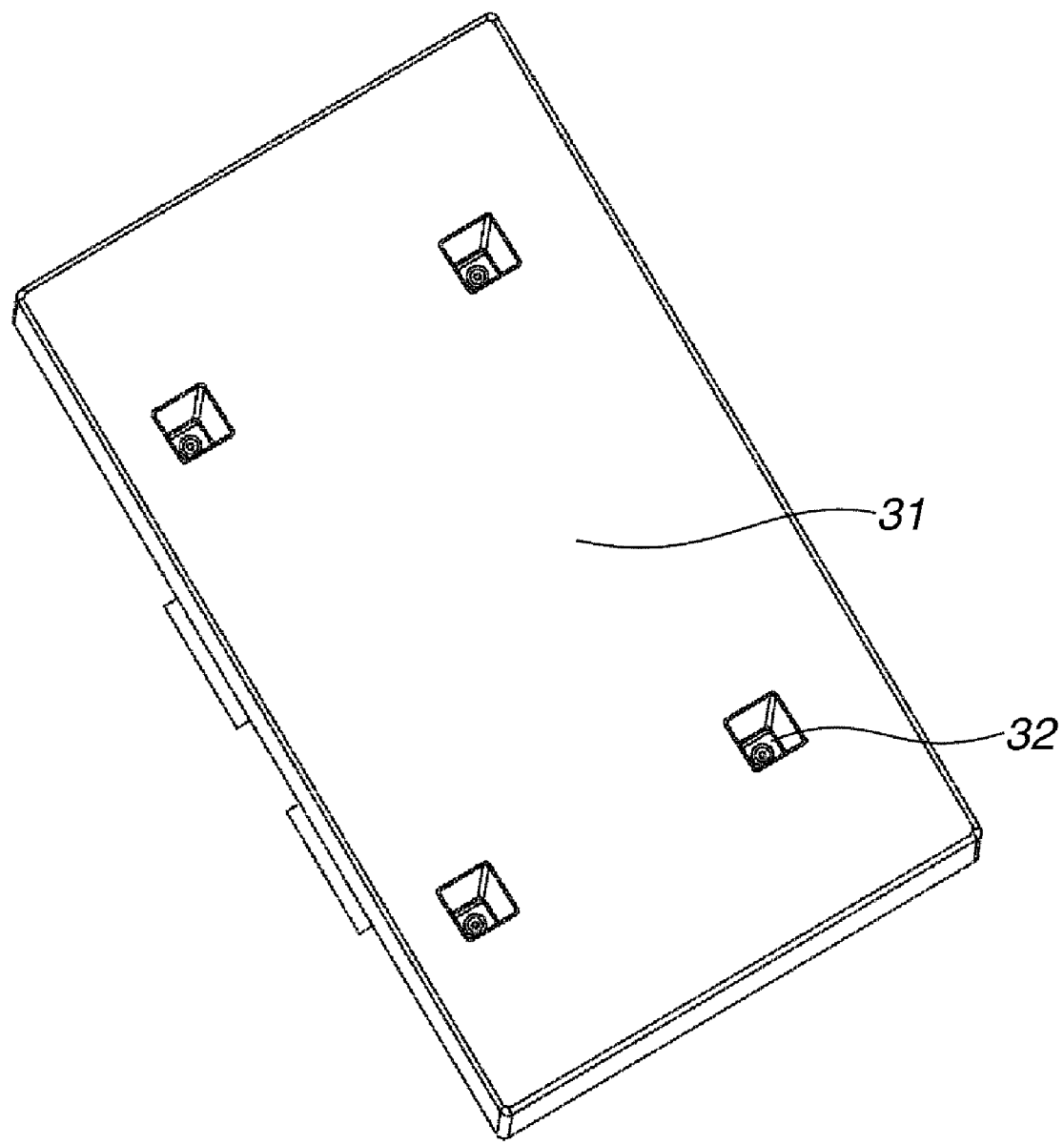
FIG. 10 is a perspective view showing an example box-type cover according to an exemplary embodiment of the present invention.
Figure 11:
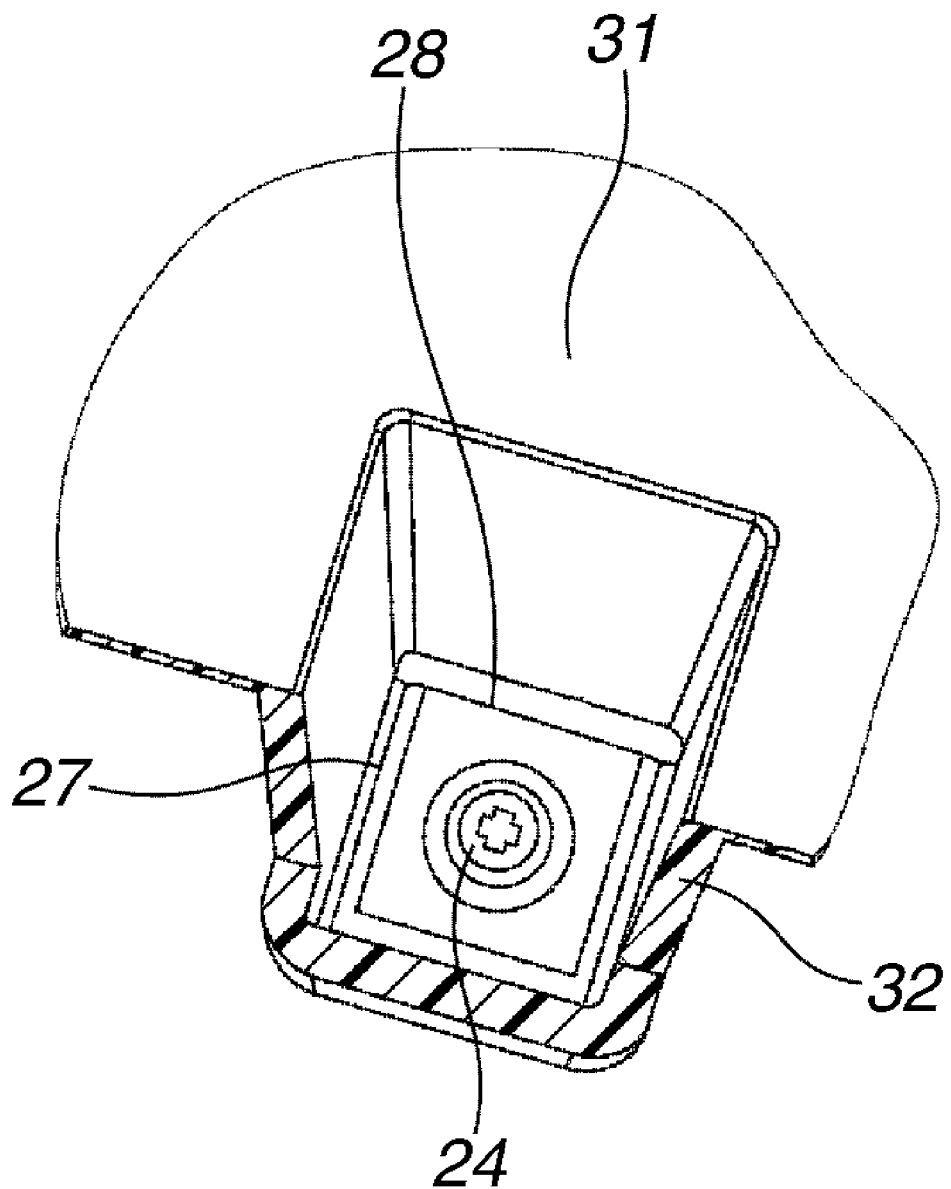
FIG. 11 is a detailed diagram showing an example attaching portion of a box-type cover according to an exemplary embodiment of the present invention.

Alternatively, as illustrated in FIGS. 10 and 11, a cylindrical attaching portion 32 extends from the surface of a box-like cover 31. In these cases, a continuous linear groove 27 can also be provided to surround the screw 24 from the end face 28 to the end face 28 of the screw-fastened portion 23. Thus, the duct 26 or the box-like cover 31 can be separated from the metal frame 25 while leaving the screw-fastened portion 23.

As described above, the major portion 22 (see FIG. 4) of the exterior cover 21 is a component made of only a biodegradable plastic. A component made of only a biodegradable plastic can be subjected to enzyme degradation.

On the other hand, the screw-fastened portion 23 that is a part of the exterior cover 21 remains on the metal frame 25 together with the screw 24. In order to separate off only a metal, the metal frame 25 with the screw-fastened portion 23 is immersed in a degradative enzyme for biodegradable plastic. Since the amount of biodegradable plastic has been decreased in the above-described process, a time period required for degradation can be reduced.

Furthermore, in the present exemplary embodiment, a plurality of grooves, which serve as a guide portion for guiding a degradative enzyme liquid, can be provided on the junction surface side of the exterior cover 21 so as to easily deliver the degradative enzyme liquid to a junction surface between the metal frame 25 and the exterior cover 21. In a conventional configuration, since it is difficult to immerse the junction surface in a degradative enzyme liquid, a decomposition rate of biodegradable plastic is low. However, according to the present exemplary embodiment, a contact area between the junction surface and a degradative enzyme liquid can be increased.

Accordingly, a decomposition rate of biodegradable plastic can be increased. In the present exemplary embodiment, a plurality of grooves are provided on the junction surface side of the exterior cover 21. However, a plurality of grooves can also be provided on the junction surface side of the metal frame 25 or both the junction surface sides of the exterior cover 21 and the metal frame 25.

Figure 12:
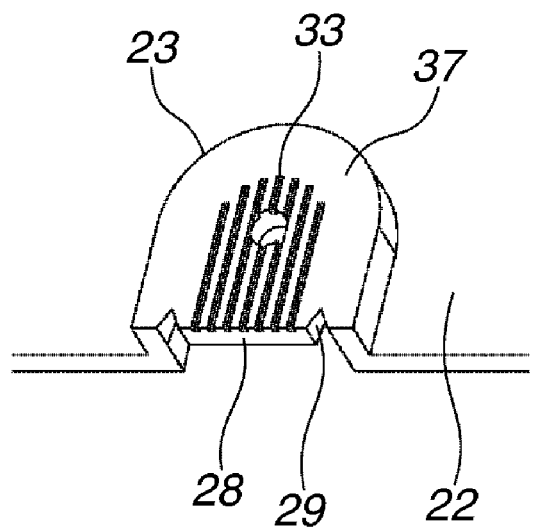
FIG. 12 is a detail diagram showing an example attaching surface side of a screw-fastened portion according to an exemplary embodiment of the present invention.
Figure 13:
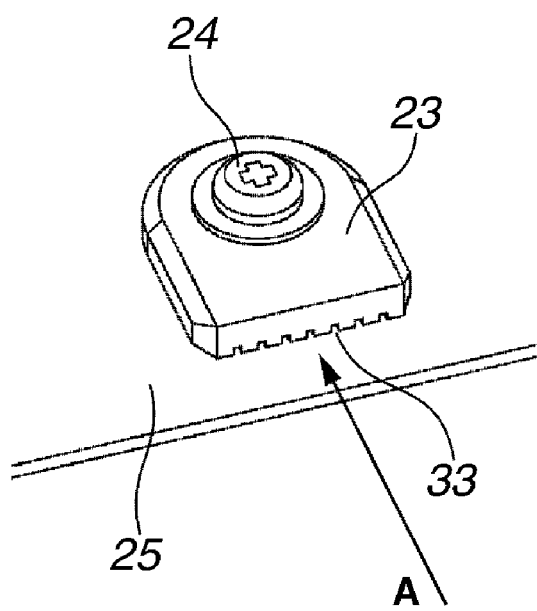
FIG. 13 is a perspective view showing an example screw-fastened portion provided with grooves on an attaching surface according to an exemplary embodiment of the present invention.

More specifically, as illustrated in FIG. 12, the screw-fastened portion 23 is provided with a plurality of grooves 33. The plurality of grooves 33 are formed on the junction surface side 37 of the exterior cover 21 and extend from the end face 28 in a continuous linear fashion. Accordingly, a degradative enzyme liquid can flow into the junction surface of the screw-fastened portion 23 from the grooves 33 in the direction of an arrow A illustrated in FIG. 13. Thus, the contact area between the screw-fastened portion 23, which is made of biodegradable plastic, and a degradative enzyme is increased. Therefore, a decomposition time can be reduced. Additionally, the groove 33 can bend slightly as long as the groove 33 connects to an inflow port for a degradative enzyme liquid.

With regard to the strength of the screw-fastened portion 23, the thickness of the member can be maintained at an area without grooves. Thus, if an excessively large number of grooves or an excessively deep groove is not provided, the strength of the screw-fastened portion 23 can be secured.

Furthermore, the grooves 33, into which an enzyme can flow, can be formed in any shape as long as the contact area between the enzyme and the biodegradable plastic can be increased, and as long as the strength at the screw-fastened portion 23 is not remarkably reduced.

Figure 14:
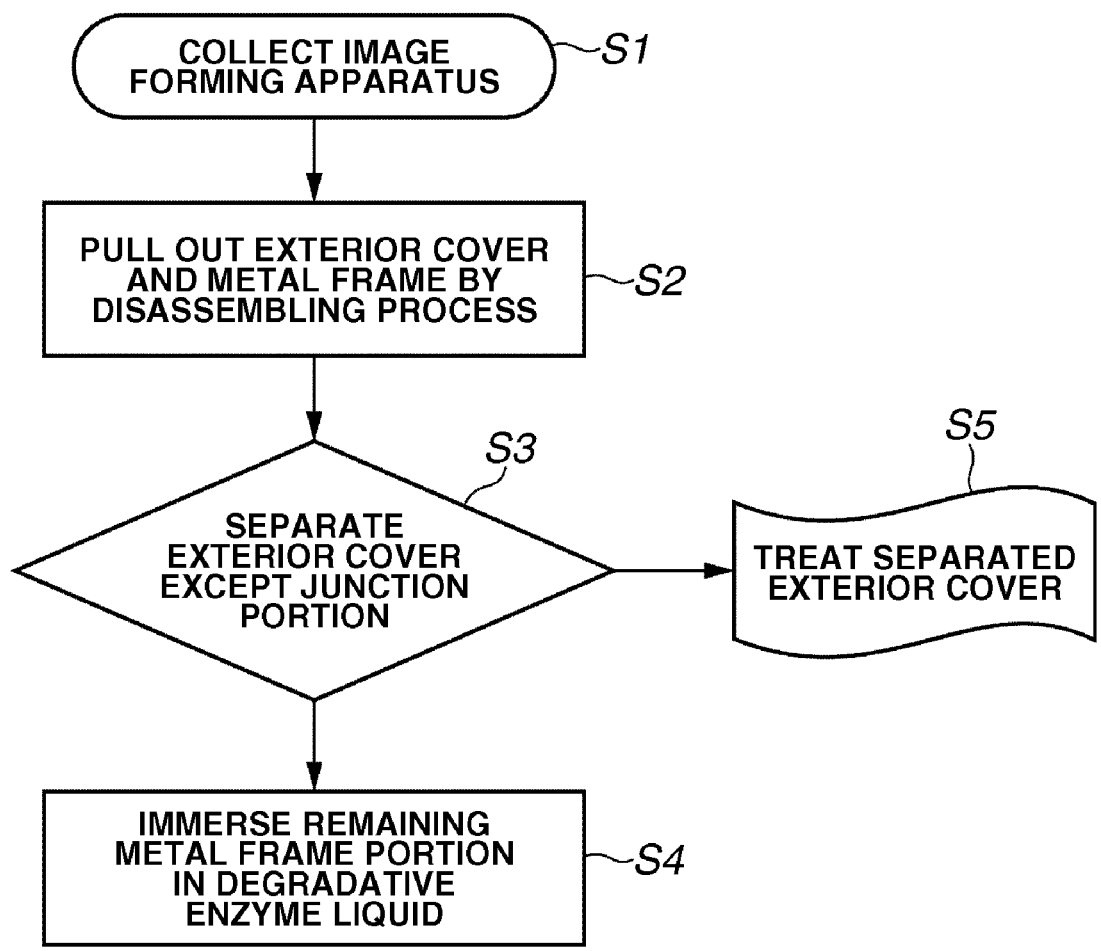
FIG. 14 is a flow chart showing an example disassembling process according to an exemplary embodiment of the present invention.

A method for disassembling an image forming apparatus will now be described briefly with reference to FIG. 14. First, an image forming apparatus is collected (step S1). The collected image forming apparatus is disassembled. A member for the image forming apparatus having a biodegradable plastic is pulled out. In the present exemplary embodiment, a member integrated with a metal frame and an exterior cover is pulled out (step S2). Only a biodegradable plastic portion of the exterior cover is separated off (step S3). The separated biodegradable plastic portion is subjected to degradation treatment, such as immersion in a degradative enzyme liquid (step S5). On the other hand, the remaining metal frame portion with a remaining biodegradable plastic portion is introduced into a vessel filled with the degradative enzyme liquid so as to immerse at least the entire biodegradable plastic portion in the degradative enzyme liquid (step S4). Additionally, the entire metal frame portion may be immersed in the degradative enzyme liquid.

According to the present exemplary embodiment, when a biodegradable plastic component and another component are joined together, even if the biodegradable plastic component and another component are immersed in a degradative enzyme liquid in a state in which the biodegradable plastic component and another component are joined together, the separation between the biodegradable plastic component and another component can be carried out in a short time.

Furthermore, in the present exemplary embodiment, the biodegradable plastic component can be any component other than an exterior cover. For example, in the case of a copying machine, a minute quantity of toner scattered from a developing portion or a cleaning portion attaches to the back of a cover or an air flow portion inside the copying machine. If these components are plastic, a disassembling process can be performed without some work of toner cleaning. Thus, a treatment process can be made short.

Moreover, in the present exemplary embodiment, the non-biodegradable material is metal. However, the non-biodegradable material may be a resin other than a biodegradable plastic.

Second Exemplary Embodiment

According to a second exemplary embodiment, a guide portion for guiding a degradative enzyme liquid into a junction portion between a first component made of a biodegradable plastic and a second component made of a non-biodegradable material has a configuration different from that described in the first exemplary embodiment.

Figure 15:
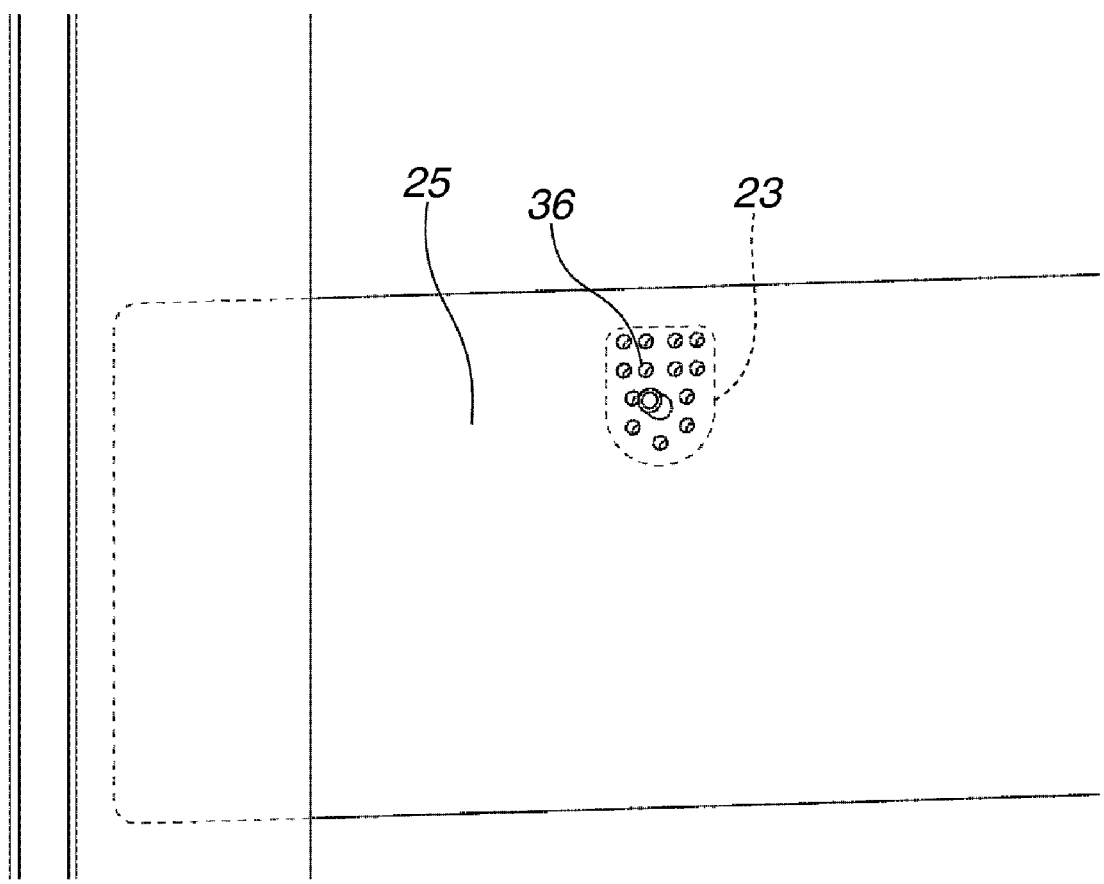
FIG. 15 is a perspective view showing an example metal frame provided with holes around a screw-fastened portion according to an exemplary embodiment of the present invention.

As illustrated in FIG. 15, the second component is provided with a plurality of through-holes 36 passing through toward the junction surface between the first component and the second component. The degradative enzyme contacts with the junction surface through the through-holes 36. Thus, a similar effect can be obtained. Additionally, the through-holes 36 of the metal component can be employed together with the small grooves 33, into which a degradative enzyme flows, described in the first exemplary embodiment. In the second exemplary embodiment, the through-holes 36 are provided on the second component. However, the through-holes 36 can be provided on the first component or on both of the first component and the second component.

According to the above-described exemplary embodiments, the screw-fastened portion 23, which is made of biodegradable plastic, is decomposed and separated from the metal frame 25 in an entirely dissolving state or a partially dissolving state. Accordingly, only metal components, i.e., the metal frame 25 and the screw 24, remain, thus proceeding to a treatment process for a metal component.

In the above-described exemplary embodiments, a screw is used as a joining member. However, any other type of joining member can be employed.

As described above, when a biodegradable plastic component and another component are joined together, even if the biodegradable plastic component and another component are immersed in a degradative enzyme liquid in a state in which the biodegradable plastic component and another component are joined together, the separation between the biodegradable plastic component and another component can be carried out in a short time. The exemplary embodiments according to the present invention have been described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-368251 filed Dec. 21, 2005, which is hereby incorporated by reference herein in its entirety.

What is claimed:

1. A fastening assembly for a device comprising:
    a first component made of a biodegradable plastic material;
    a second component made of metal securely joined to the first component;
    a fastener for fastening the first component and the second component;
    a fastening surface, formed on the first component, for fastening the first component and the second component;
    a fastened surface, formed on the second component, fastened to the fastening surface formed on the first component;
    a passing hole, formed on the first component, through which the fastener passes so as to fasten the fastening surface of the first component and the fastened surface of the second component; and
    first and second grooves, provided on the fastening surface of the first component, which extend to an outer edge of the fastening surface of the first component and do not contact the fastened surface of the second component for guiding a degradation liquid for degrading the biodegradable plastic from outside to the a fastening surface between the first and second components while the fastened surface of the second component is fastened to the fastening surface of the first component by the fastener,
    wherein the first groove, being of straight line shape, reaches directly to the passing hole while the fastened surface of the second component is fastened to the fastening surface of the first component by the fastener, and
    wherein the second groove, being of straight line shape, is formed side by side with the first groove so as not to reach the passing hole.

2. The fastening assembly for a device according to claim 1, wherein the first component has a third groove that is formed continuously and linearly to surround the fastening surface.

3. The fastening assembly for a device according to claim 2, wherein the first component has a notch provided on at least one of a starting point and an end point of the third groove.

* * * * *